US007751969B2

(12) United States Patent
Jung et al.

(10) Patent No.: US 7,751,969 B2
(45) Date of Patent: Jul. 6, 2010

(54) METHOD FOR DISPLAYING MAP INFORMATION

(75) Inventors: Thomas Jung, Bielefeld (DE); Lothar-Frank Smirnov, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 436 days.

(21) Appl. No.: 11/659,557

(22) PCT Filed: Jul. 15, 2005

(86) PCT No.: PCT/EP2005/053417

§ 371 (c)(1),
(2), (4) Date: Oct. 2, 2007

(87) PCT Pub. No.: WO2006/018358

PCT Pub. Date: Feb. 23, 2006

(65) Prior Publication Data

US 2008/0195303 A1    Aug. 14, 2008

(30) Foreign Application Priority Data

Aug. 10, 2004    (DE) .................. 10 2004 038 739

(51) Int. Cl.
*G01C 21/00* (2006.01)
(52) U.S. Cl. .............. 701/200; 701/212; 340/995.1; 340/995.11; 340/995.14; 340/995.15; 340/995.18; 340/995.24
(58) Field of Classification Search ........... 701/212, 701/200; 340/995.1, 995.11, 995.14, 995.15, 340/995.18, 995.24
See application file for complete search history.

(56) References Cited

U.S. PATENT DOCUMENTS

| 5,917,436 | A | * | 6/1999 | Endo et al. ............. 340/995.14 |
| 6,006,161 | A | * | 12/1999 | Katou ..................... 701/212 |
| 6,144,920 | A | * | 11/2000 | Mikame .................. 701/212 |
| 6,182,010 | B1 | * | 1/2001 | Berstis .................... 701/211 |
| 6,321,158 | B1 | * | 11/2001 | DeLorme et al. ........... 701/201 |
| 6,477,526 | B2 | * | 11/2002 | Hayashi et al. ............. 707/4 |
| 6,697,734 | B1 | * | 2/2004 | Suomela ................... 701/212 |
| 6,725,154 | B2 | * | 4/2004 | Kamikawa et al. .......... 701/208 |
| 6,950,743 | B2 | * | 9/2005 | Kainuma et al. ........... 701/208 |
| 7,135,994 | B2 | * | 11/2006 | Kamikawa et al. ..... 340/995.14 |

(Continued)

FOREIGN PATENT DOCUMENTS

CN    1412525    4/2003

(Continued)

OTHER PUBLICATIONS

* Patent Abstracts of Japan, Bd. 2000. Nr. 13, Feb. 5, 2001 and JP 2000 283784 (Matsushita Electric Ind. Co. Ltd.), Oct. 13, 2000.

*Primary Examiner*—Khoi Tran
*Assistant Examiner*—Jaime Figueroa
(74) *Attorney, Agent, or Firm*—Kenyon & Kenyon LLP

(57) ABSTRACT

A method for displaying map information for a navigation system provides map information which includes areas representing a top view of a map detail, and lines representing a grid of traffic routes. The display of the area information includes additional background information, i.e., the display of the areas in a two-dimensional or three-dimensional view is at least partially generated on the basis of aerial and/or satellite photographs.

17 Claims, 3 Drawing Sheets

U.S. PATENT DOCUMENTS

2002/0177944 A1* 11/2002 Ihara et al. ................. 701/208
2003/0078724 A1 4/2003 Kamikawa et al.
2003/0236618 A1 12/2003 Kamikawa et al.
2006/0136125 A1* 6/2006 Chua ......................... 701/208

FOREIGN PATENT DOCUMENTS

| | | |
|---|---|---|
| DE | 103 36 581 | 4/2004 |
| EP | 1 435 508 | 7/2004 |
| JP | 1-163608 | 6/1989 |

* cited by examiner

METHOD FOR DISPLAYING MAP INFORMATION

BACKGROUND OF THE INVENTION

1. Field of the Invention

The present invention relates to a navigation system and a method for displaying map information, in which the map information includes areas representing a top view of a map detail and lines representing a grid of traffic routes.

2. Description of Related Art

Navigation systems have been widely used in previous years, in particular for use in motor vehicles. The basic functions "position finding," "destination selection," "route computation," and "destination guidance" are implemented in the known systems. A digital map of the road network is required for all functions, the digital map typically being placed and stored on a CD-ROM, a DVD, or an HD.

In addition, the display is possible as a colored map. Depending on the system, display of the map on a color monitor may take place over a scale range of approximately 1:8,000 to 1:16,000,000. This display is helpful in order to obtain an overview of the route in the nearer and farther surroundings, depending on the scale. The orientation is facilitated by topographic information, e.g., built-up areas, bodies of water, forests, and railroad lines.

In current navigation systems having a map display, the information is displayed in the form of a vector map on a color monitor. The vectorization makes possible the change of the display scale based on the same underlying stored data.

In this map display, the total information is composed of areas, lines, and dots. The region to be displayed is characterized by different coloring of the areas. A built-up area, i.e., a town, is often colored red. Bodies of water are indicated by blue areas and fields and forests are indicated by different shades of green. Lines of different thicknesses and colors are used in the display to indicate different roads, railroad lines, or rivers. Individual dots or icons are inserted into the overall map display as a further layout element for POIs (points of interest), e.g., gas stations, repair shops, hotels, etc.

The area display is highly simplified and hence very abstract. Especially in a display having higher resolution, i.e., in particular of the nearer surroundings, additional information which would facilitate the orientation of the user is unobtainable from the display.

A BRIEF SUMMARY OF THE INVENTION

It is therefore an object of the present invention to improve the display of the area information in maps for navigation systems by providing extended background information.

According to the present invention, this object is achieved by generating the area display in a two-dimensional or three-dimensional view at least partially based on aerial and/or satellite photographs. This additionally structured background information, e.g., building contours and vegetation, helps the user relate the information of the map to reality, thereby clearly facilitating his/her orientation. The three-dimensional view makes a perspective display possible.

In an example implementation of the method according to the present invention, the resolution of the aerial and/or satellite photographs is varied as a function of the map detail to be displayed. This makes it possible to adapt the accuracy of the display according to the situation.

In an advantageous refinement of the method according to the present invention, the resolution of the aerial and/or satellite photographs is varied as a function of at least one structural parameter. This makes it possible to reduce the quantity of required data in a sensible manner. Therefore, it is expedient that a higher resolution is output in areas of greater importance, i.e., greater accuracy of the objects to be displayed. The resolution and thus the quantity of data to be stored may be reduced for areas of lesser importance for the use of a navigation system.

The average population figure per area is taken into account as a structural parameter. This structural parameter takes into account the fact that the population density in built-up areas, e.g., cities, is distinctly higher than in rural areas.

The average number of buildings per area is taken into account as a further advantageous structural parameter. In principle, this parameter is similar to the previous structural parameter in which the population figure is taken into account; however, the number of buildings per area is directly obtainable from the aerial and/or satellite photograph without having to use other sources, e.g., statistics of the registry offices.

In a refinement of the method according to the present invention, at least one point in space is marked in the map information using a picture element. The picture element may be, for example, a pictogram or an icon with which a POI is indicated in the map.

In an example implementation of the method according to the present invention, selected areas of the map information are highlighted, e.g., by transparent colorization. Using the colored highlighting, public buildings may be marked, for example, which usually cannot be distinguished from privately used buildings in the top view of an aerial and/or satellite photograph.

A navigation system for executing the method according to the present invention has a memory device for map information data, a processor device which processes the map information data, and a display device which outputs the processed map information data. As map information data, the vectorized road network as well as the image data from aerial and/or satellite photographs are stored in the memory device as area information data. The memory device may be used in any desired way, i.e., any optical and/or magnetic memory device may be used for implementation. The processor device merges the different map information data in such a way that a uniform display including areas, lines, and dots is generated. The merged map is subsequently output on the display device, e.g., a color monitor.

In a navigation system according to the present invention, the memory device has a CD (compact disc) and/or a DVD (digital versatile disc). This makes simple updates of the existing data and/or exchange for use in another state or country possible.

The memory device of a navigation system according to the present invention includes image data from aerial and/or satellite photographs having different resolutions. This makes a variably accurate display possible depending on the importance of the particular area.

BRIEF DESCRIPTION OF THE INVENTION

Figure 1:
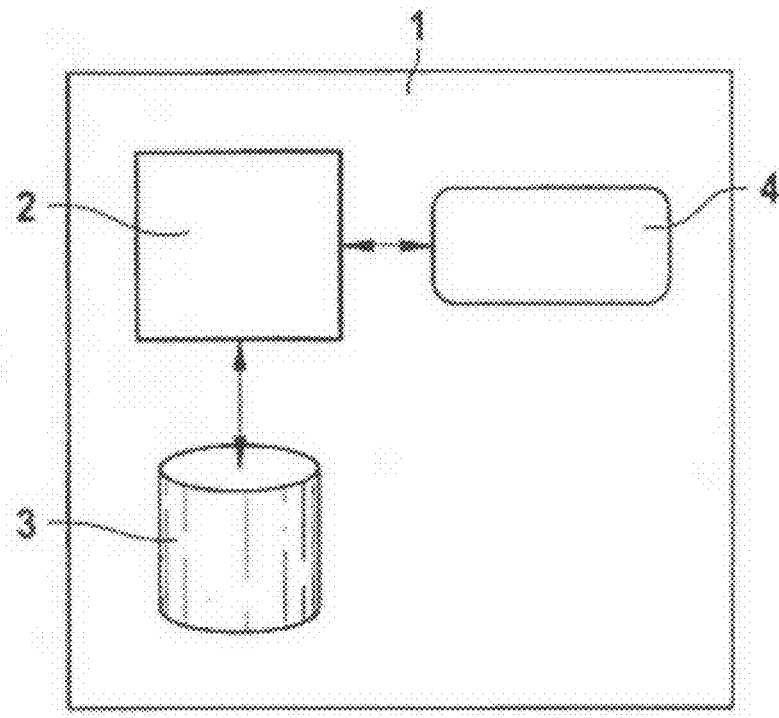
FIG. 1 shows a schematic outline of a navigation system for executing the method according to the present invention.
Figure 5:
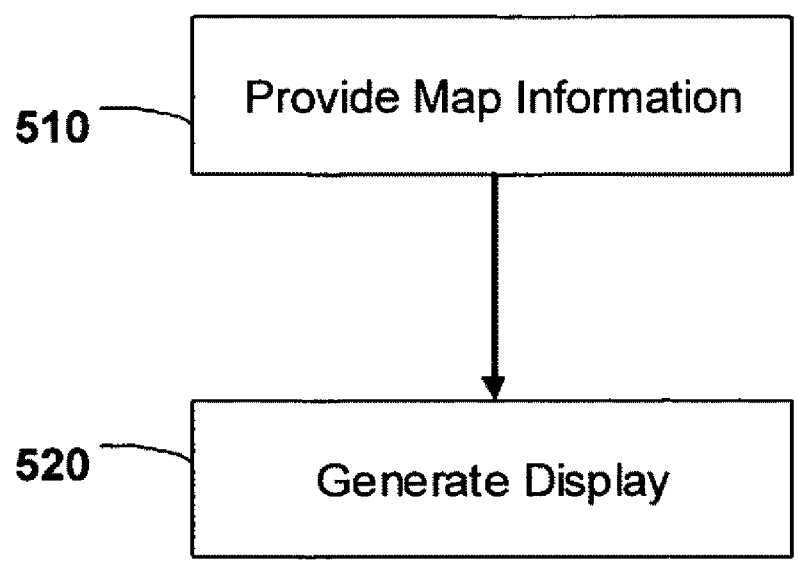
FIG. 5 shows a flow chart of an example embodiment of the method according to the present invention.

FIG. 1 schematically shows a navigation system 1 including a processor device 2. Processor device 2 is connected to a memory device 3 and processes the map information stored in memory device 3. FIG. 5 shows a flow chart in which the map display generated by processor device 2 in step 510, e.g., a superimposition of the vectorized map of the road network with aerial and/or satellite photographs, is subsequently output on display device 4 in step 520, e.g., a color monitor.

Figure 2:
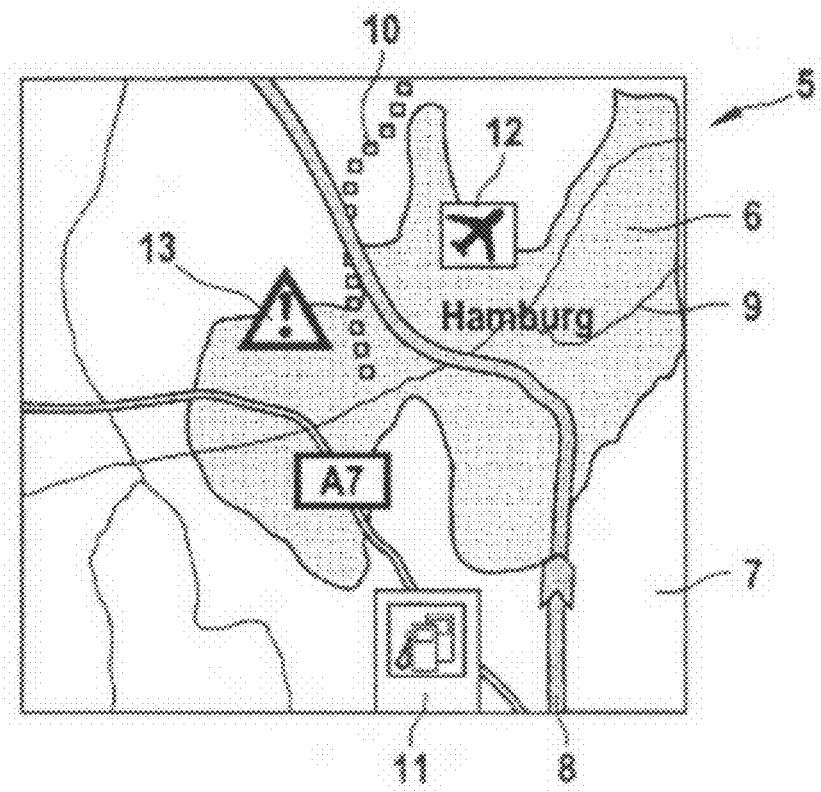
FIG. 2 shows a typical map display for a navigation system.

The method according to the present invention is described in greater detail in the following. A map detail 5 showing a subarea of a metropolitan area, Greater Hamburg in the present example, is represented in FIG. 2. The area information is essentially differentiated by two different colors. The darker area 6 indicates a built-up area. The lighter area 7 indicates essentially natural areas, in particular fields and forests.

Furthermore, different lines 8, 9, and 10 which indicate the road network are shown in the figure. Road 8, more clearly highlighted in terms of color, is a freeway (German Autobahn), while the road indicated by reference numeral 9 is a less elaborate road, e.g., a rural road or an inner-city arterial road. Line 10, displayed in two alternating colors, shows the path of a railroad line or a railroad track.

Furthermore, additional image points or icons for indicating POIs (points of interest) exist in the display of map detail 5. Reference numeral 11 marks an icon for displaying the location of a gas station. Icon 12 indicates the position of the airport and icon 13 indicates the location of a traffic obstruction or a traffic jam.

Figure 3:
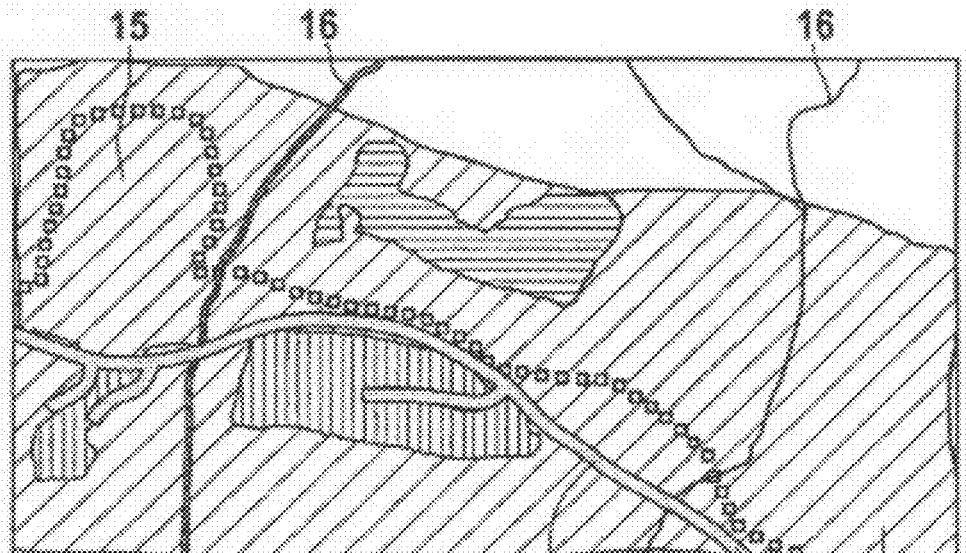
FIG. 3 shows a detail of an aerial and/or satellite photograph.

FIG. 3 shows an aerial and/or satellite photograph of the inner city. The course of a river 14 as well as densely populated areas 15 are shown in FIG. 3. FIG. 3 also shows roads 16 of different types and sizes.

Figure 4:
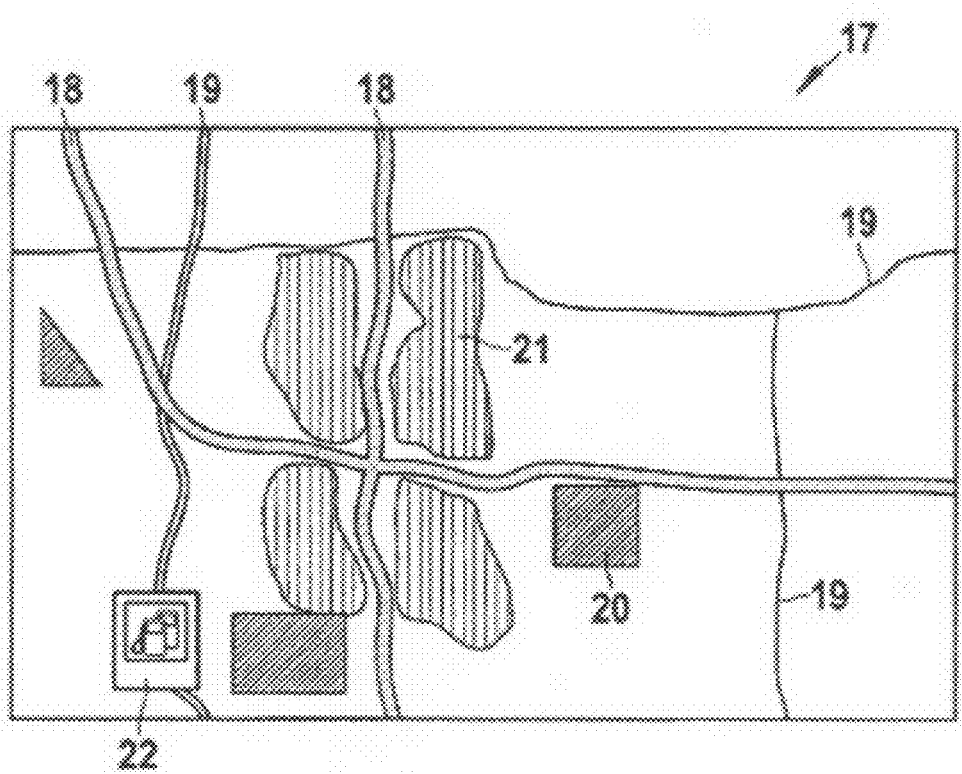
FIG. 4 shows a map display for a navigation system generated using the method according to the present invention.

FIG. 4 shows a map detail 17 generated using the method according to the present invention. Data of an aerial and/or satellite photograph are added to map detail 17 as background data. The vectorized road network is superimposed on this background image as more detailed information in such a way that a expressway 18 and additional roads 19 are clearly visible in map detail 17.

Not only a monotone area is shown between individual roads 18, 19, but the real structure of the respective area is recognizable. The user also sees in the display of the navigation system whether a building 20 or a park 21 is located adjacent to the road.

Finally, additional particular POIs are indicated using image points or icons 22. The particular image area, e.g., the outline of a public building, is transparently colored. The building stands out from the displayed surroundings and is easier to identify.

A substantial increase in map data in navigation system 1 (FIG. 1) results when the structured background information is generated via aerial and/or satellite photographs. Image information having varying degrees of resolution must be provided for different display scales. The following Table 1 lists the data quantities for Germany having an extension of approximately 876 km by 632 km.

TABLE 1

| Area | Resolution 1 million | Resolution 5 million | Resolution 20 million | Resolution 100 million |
| --- | --- | --- | --- | --- |
| 375,000 km$^2$ | 140 GB | 6 GB | 350 MB | 14 MB |

The data quantities cited above refer to a compressed data format. These specifications are an example and are only used to provide a rough orientation and, in addition, may vary as a function of the used compression algorithm.

This data clearly shows that at a high resolution, e.g., 1 million per pixel, the total data quantity is no longer able to be stored on standard memory media such as CDs or DVDs. Particularly at smaller display scales (50 m to 5 km), a reduction in the resolution results in an unsightly, unacceptable display. Only a resolution of 10 m per pixel would be able to be used area-wide, if the same resolution is selected for the entire German federal territory.

According to the present invention, the resolution for different areas is selected as a function of their importance. A structural parameter is used for evaluating the importance. This structural parameter may be the population density in the respective areas.

If the population density is incorporated in a focused segmentation of the resolutions, then more detailed image information is used in areas with a high population density. However, in mostly rural areas, which are sparsely populated and thus offer little information relevant for the orientation, only data having a coarser resolution are used. Due to this fact, the data volume of the stored image data may be distinctly reduced, while maintaining a constant viewing quality.

Table 2 shows a possible segmentation of the federal territory into resolutions of differing accuracy of the map which takes the structural parameter "population density" into account.

TABLE 2

| Inhabitants per km$^2$ | Percentage of German Territory | Corresponding Area | Resolution of the Map [m/pixel] | Memory Requirements |
| --- | --- | --- | --- | --- |
| less than 50 | 10.3% | 3,677.1 km$^2$ | 32 | 1 MB |
| 50 to 100 | 27.1% | 9,674.7 km$^2$ | 16 | 12 MB |
| 100 to 250 | 33.5% | 11,959.5 km$^2$ | 8 | 60 MB |
| 250 to 500 | 15.4% | 5,497.8 km$^2$ | 4 | 107 MB |
| more than 500 | 13.6% | 4,855.2 km$^2$ | 2 | 349 MB |
| | | | | Sum: 529 MB |

The above-named data quantities refer to a compressed data format. These data are examples and are only provided as a rough orientation and, moreover, may vary as a function of the used compression algorithm.

As is apparent from the above table, the resulting memory capacity for the image display is of a magnitude which may be stored on standard memory media, such as CDs. By using a memory medium having a greater memory capacity, e.g., a DVD, the exemplary segmentation and evaluation of the area may be varied in order to optimally utilize the memory capacity of the memory medium.

Alternatively and/or additionally to the structural parameter "population density," the development density of the respective areas may be used as an evaluation criterion. Using the development density as a structural criterion has the advantage that the information exists on the underlying aerial and/or satellite photographs themselves. An additional data source, e.g., statistics of the registry offices, is not necessary.

The road density based on the vectorized road network may also be used as another structural parameter for evaluating the areas. Of course, a combination of all three structural parameters may also be used as a meaningful evaluation scale.

What is claimed is:

1. A method for displaying map information on a display device for a navigation system, comprising:
    providing map information for display on the display device, wherein the map information includes areas representing a top view of a map detail, and wherein the map information further includes lines representing traffic routes; and
    generating a display of the areas representing the top view of the map detail in one of a two-dimensional view and a three-dimensional view,
    wherein the display of the areas representing the top view of the map detail is generated at least partially based on at least one of an aerial and satellite photograph, and
    wherein a resolution of the at least one of the aerial and satellite photograph is varied as a function of the map detail to be displayed and as a function of at least one structural parameter.

2. The method as recited in claim 1, wherein an average population figure per predetermined unit area is taken into account for the at least one structural parameter.

3. The method as recited in claim 2, wherein an average number of buildings per predetermined unit area is taken into account for the at least one structural parameter.

4. The method as recited in claim 1, wherein at least one point in space in the map information is marked by an image element.

5. The method as recited in claim 1, wherein at least one selected area of the map information is highlighted.

6. The method as recited in claim 5, wherein the highlighting is achieved by transparent coloring.

7. A navigation system for displaying map information, comprising:
    a memory device for storing map information data, wherein the map information data includes data corresponding to areas representing a top view of a map detail, and wherein the map information further includes data corresponding to lines representing traffic routes;
    a processor device configured to process the map information data for display; and
    a display device configured to output the processed map information data;
    wherein the areas representing the top view of the map detail are displayed in one of a two-dimensional view and a three-dimensional view, and
    wherein the display of the areas representing the top view of the map detail is generated at least partially based on at least one of an aerial and satellite photograph, and
    wherein a resolution of the at least one of the aerial and satellite photograph is varied as a function of the map detail to be displayed and as a function of at least one structural parameter.

8. The navigation system as recited in claim 7, wherein the memory device includes at least one of a compact disc and a digital versatile disc.

9. The navigation system as recited in claim 7, wherein the memory device stores image data of at least one of aerial photographs and satellite photographs having different resolutions.

10. The method as recited in claim 1, wherein an average number of buildings per unit area is determined directly from the aerial and/or satellite photograph and taken into account for the at least one structural parameter.

11. The method as recited in claim 1, wherein the resolution of each of the at least one of the aerial and satellite photograph is a function of the importance of each of the at least one of the aerial and satellite photograph, accordingly.

12. The method as recited in claim 1, wherein the total memory capacity of the navigation system is taken into account for the at least one structural parameter.

13. The navigation system as recited in claim 7, wherein an average number of buildings per unit area is determined directly from the aerial and/or satellite photograph and taken into account for the at least one structural parameter.

14. The navigation system as recited in claim 7, wherein the resolution of each of the at least one of the aerial and satellite photograph is a function of the importance of each of the at least one of the aerial and satellite photograph, accordingly.

15. The navigation system as recited in claim 7, wherein the memory device is taken into consideration in determining the resolution of each of the at least one of the aerial and satellite photograph.

16. The method as recited in claim 1, wherein an average number of buildings per unit area is determined directly from the aerial and/or satellite photograph and taken into account for the at least one structural parameter, wherein the resolution of each of the at least one of the aerial and satellite photograph is a function of the importance of each of the at least one of the aerial and satellite photograph, accordingly, and wherein the total memory capacity of the navigation system is taken into account for the at least one structural parameter.

17. The navigation system as recited in claim 7, wherein an average number of buildings per unit area is determined directly from the aerial and/or satellite photograph and taken into account for the at least one structural parameter, wherein the resolution of each of the at least one of the aerial and satellite photograph is a function of the importance of each of the at least one of the aerial and satellite photograph, accordingly, and wherein the memory device is taken into consideration in determining the resolution of each of the at least one of the aerial and satellite photograph.

* * * * *